United States Patent
Nishimura et al.

(10) Patent No.: US 8,004,941 B2
(45) Date of Patent: Aug. 23, 2011

(54) OPTICAL DISK APPARATUS AND TEST WRITING METHOD

(75) Inventors: Koichiro Nishimura, Yokohama (JP); Toru Kawashima, Mito (JP); Mitsuru Harai, Tokyo (JP); Tsuyoshi Toda, Kodaira (JP)

(73) Assignees: Hitachi Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 988 days.

(21) Appl. No.: 11/490,532

(22) Filed: Jul. 21, 2006

(65) Prior Publication Data
US 2007/0183284 A1    Aug. 9, 2007

(30) Foreign Application Priority Data
Feb. 6, 2006    (JP) ................. 2006-028121

(51) Int. Cl.
*G11B 5/00*    (2006.01)
(52) U.S. Cl. .................. 369/47.53; 369/44.32
(58) Field of Classification Search ............... 369/47.53, 369/47.5, 47.51, 47.52, 44.32, 53.19, 53.15, 369/47.14; 714/710, 711
See application file for complete search history.

(56) References Cited

U.S. PATENT DOCUMENTS

| 7,035,180 | B2 | 4/2006 | Kawashima et al. | |
| 2002/0131350 | A1* | 9/2002 | Kurobe et al. | 369/47.53 |
| 2003/0142608 | A1* | 7/2003 | Yamamoto et al. | 369/47.14 |
| 2005/0265212 | A1* | 12/2005 | Yoshida et al. | 369/53.15 |
| 2006/0013095 | A1* | 1/2006 | Liu et al. | 369/47.14 |

FOREIGN PATENT DOCUMENTS

| JP | 1-054778 (B) | 3/1989 |
| JP | 2002-319135 | 10/2002 |
| JP | 2003-208715 (A1) | 7/2003 |
| JP | 2005-182886 | 7/2005 |

* cited by examiner

*Primary Examiner* — Tan X Dinh
(74) *Attorney, Agent, or Firm* — McDermott Will & Emery LLP

(57) ABSTRACT

Test writing is executed while skipping areas where deviations are present on an optical disk to thereby improve accuracy and reliability of an optimum recording condition to be derived. A deviation detecting unit detects the deviations of a guide groove on the optical disk on the basis of a fluctuation amount of a focus error signal or a tracking error signal, and registers information of the detected deviations onto a memory. A test writing processing unit refers to the memory, and records and reproduces a test signal while skipping the areas where the deviations are detected.

8 Claims, 4 Drawing Sheets

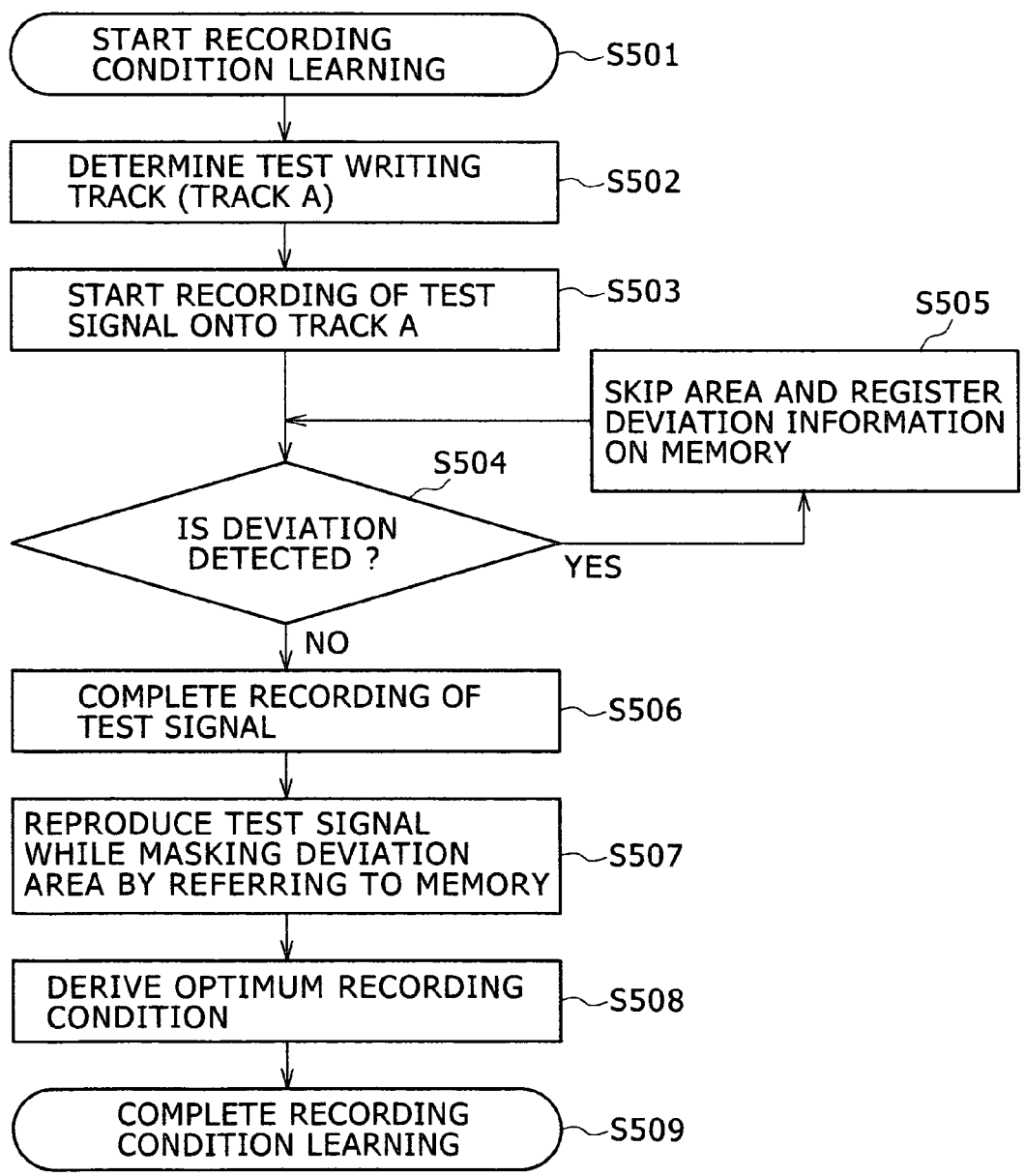

OPTICAL DISK APPARATUS AND TEST WRITING METHOD

CLAIM OF PRIORITY

The present application claims priority from Japanese application serial no. JP 2006-28121, filed on Feb. 6, 2006, the content of which is hereby incorporated by reference into this application.

BACKGROUND OF THE INVENTION (1) Field of the Invention

The present invention relates to an optical disk apparatus and a test writing method for recording data onto an optical disk, and particularly to a technique for performing test writing with high accuracy.

(2) Description of the Related Art

In an optical disk apparatus, when a laser beam is irradiated onto an optical disk to record data, a laser power is adjusted so that the data is recorded with a power suitable for characteristics of the optical disk and environment in which the optical disk is used. The adjustment of the laser power is called OPC (Optimum Power Control). The OPC allows a test signal whose laser powers are changed stepwise to be recorded for test writing at test writing areas on the disk, and the signal is reproduced so that the quality of the reproduced signal, e.g., β (asymmetry) and the like are assessed, to thereby set the laser power with which target β can be obtained, as the optimum recording power. The process of optimizing recording conditions when recording data as described above is hereinafter referred to also as recording condition learning. It should be noted that not only the adjustment of the laser power, but also the adjustment of timing of laser power changes is performed in the recording condition learning in some cases. Therefore, the recording condition learning, together with the above-described OPC is hereinafter referred to also as test writing.

However, when some defects and the like are present at the test writing areas on the optical disk, the recording condition learning is not properly performed. As a result, the optimum recording condition cannot be obtained, or even if the optimum recording condition can be obtained, the obtained condition is out of the range of a correct condition, which causes a trouble in subsequent data recording. In order to execute the test writing while skipping such defects on the disk, the following techniques are proposed.

Japanese Patent Application Laid-Open No. 2005-182886 discloses a technique in which a test writing management area is provided on an optical disk, information about test writing areas (location information about areas where deterioration or defects of a film surface are present, information about a state of the film surface, and the like) is recorded in the test writing management area, and test writing is executed while skipping the areas where the deterioration or defects are present on the basis of the information.

Japanese Patent Application Laid-Open No. 2002-319135 discloses a technique in which an optical disk with no data being recorded is played in advance, physical states (flaws, fingerprints and the like on a recording surface of the optical disk) of areas where data is recorded are detected by using an obtained signal, and the locations where the flaws, fingerprints and the like are detected are excluded from targets to be assessed, so that data recording can always be performed on the optimum condition irrespective of the physical states such as the flaws and fingerprints on the optical disk.

SUMMARY OF THE INVENTION

In response to high-speed recording, recording by a CAV (Constant Angular Velocity) method has recently been adopted. However, in the case of the CAV method, a recording/reproducing angular velocity is increased as nearer to the outer circumference of a disk. Therefore, the test writing areas for the recording condition learning are provided at the outermost circumference on, for instance, a DVD-RAM, and the optimum recording condition in accordance with the maximum speed of the disk is derived by using the outer circumferential areas.

In the case where an optical disk is allowed to rotate at a high speed for test writing, there is a possibility that the recording condition learning is incorrectly performed due to deviations that are present on the disk, and thus the optimum recording condition is incorrectly derived. In the present invention, the affect caused by the deviations is raised as a problem.

Here, the deviation means a partial defective shape (irregularities, undulations and the like) of a guide groove that is formed in advance on a disk substrate, and of a surface of the disk substrate. The deviation is generated in a stamper process and the like at the time of manufacturing the disk substrate. If no defects are present on a recording film formed on the substrate, the test writing itself is properly performed. However, if the deviations are present in the guide groove, a servo control for focus and tracking cannot follow at the outer circumferential areas of the disk that rotates at a high speed. As a result, a reproduced signal obtained becomes unstable, and the optimum recording condition to be derived becomes poor in accuracy and reliability.

The defect on the disk that is raised as a problem in Japanese Patent Application Laid-Open No. 2005-182886 and Japanese Patent Application Laid-Open No. 2002-319135 is a defect of a recording film (or a surface of a film), which is a factor different from the deviation of the guide groove that is raised as a problem in the present invention. Further, the defect of the recording film can be detected from a lack of the reproduced signal or an abnormal level of the reproduced signal, however, the deviation cannot be detected only from the level of the reproduced signal, and thus new measures are needed.

The object of the present invention is to execute test writing (recording condition learning) while skipping areas where deviations are present on an optical disk to thereby improve accuracy and reliability of the optimum recording condition to be derived.

According to one aspect of the present invention, there is provided an optical disk apparatus for adjusting a recording condition by test writing when a laser beam is irradiated on an optical disk for recording data, including: a spindle motor which rotates the optical disk; a pickup which irradiates the laser beam on test writing areas of the optical disk to record and reproduce a test signal; a signal processing unit which obtains a reproduced signal of the test signal, and a focus error signal or a tracking error signal from a signal detected by the pickup; a deviation detecting unit which detects deviations of a guide groove on the optical disk on the basis of a fluctuation amount of the obtained focus error signal or tracking error signal; and a test writing processing unit which supplies the test signal to the pickup and assessing the quality of the reproduced signal of the test signal that is obtained by the signal processing unit to adjust the recording condition, wherein the test writing processing unit records the test signal while skipping areas where the deviations are detected by the deviation detecting unit, and reproduces the test signal while skipping the areas.

According to another aspect of the present invention, there is provided the optical disk apparatus, further including a memory on which information about the deviations detected by the deviation detecting unit is registered, wherein the test writing processing unit interrupts the recording and reproducing of the test signal in the areas where the deviations are detected by referring to the information about the deviations registered on the memory.

According to still another aspect of the present invention, there is provided a test writing method for adjusting a recording condition when a laser beam is irradiated on an optical disk for recording data, including the steps of: obtaining a focus error signal or a tracking error signal from areas on the optical disk where test writing is performed; detecting deviations of a guide groove on the optical disk on the basis of a fluctuation amount of the obtained focus error signal or tracking error signal; recording a test signal while skipping areas where the deviations are detected, and reproducing the test signal while skipping the areas; and assessing the quality of the reproduced test signal to adjust the recording condition.

BRIEF DESCRIPTION OF THE DRAWINGS

FIG. 5 is a flowchart showing another example of the test writing process.

DETAILED DESCRIPTION OF THE PREFERRED EMBODIMENTS

Figure 1:
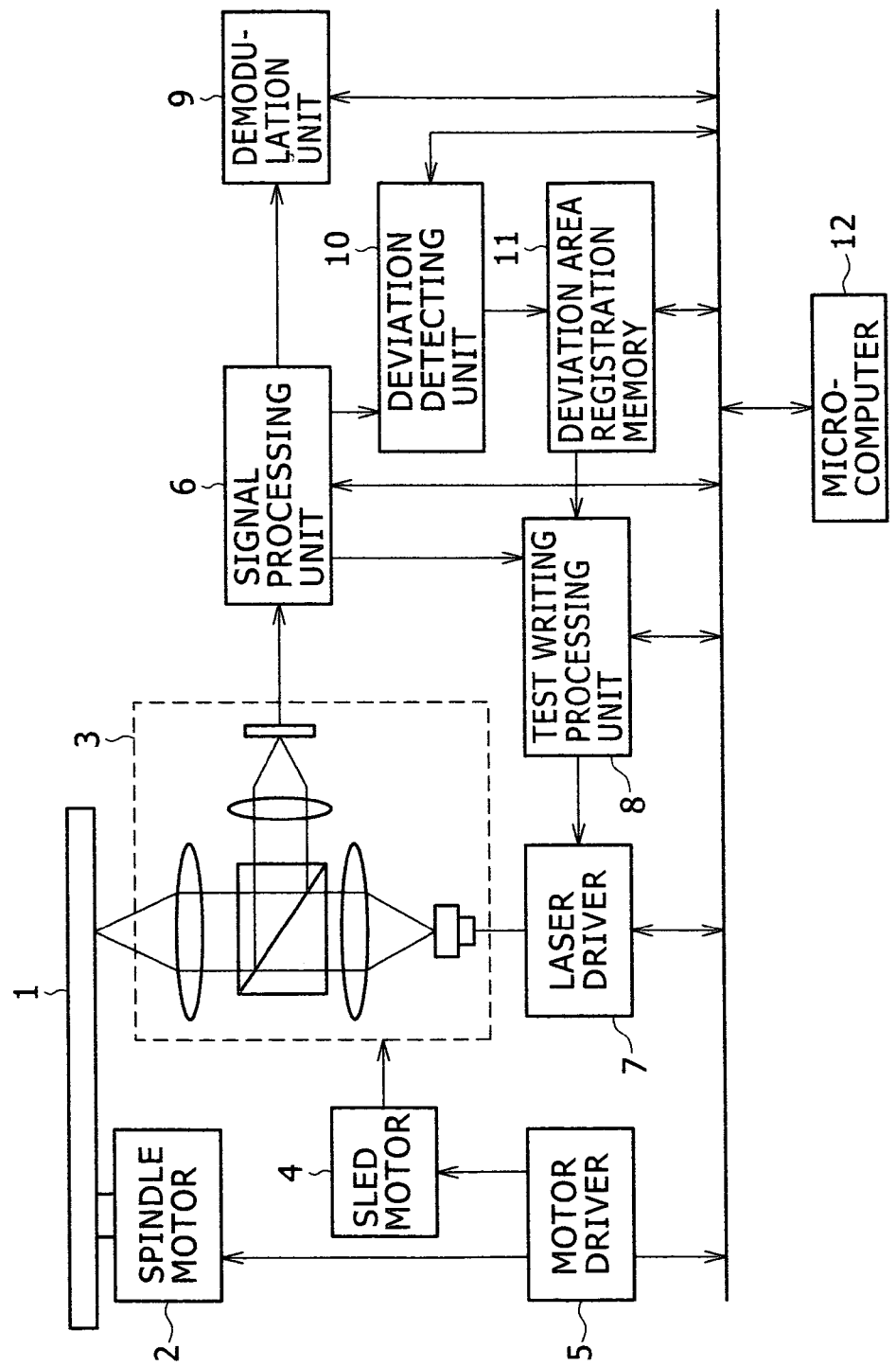
FIG. 1 is a block diagram showing an embodiment of an optical disk apparatus according to the present invention.

FIG. 1 is a block diagram showing an embodiment of an optical disk apparatus according to the present invention. The apparatus according to the present invention allows a spindle motor 2 to rotate a loaded optical disk 1. A pickup 3 irradiates a laser beam generated by a semiconductor laser onto a recording surface of the optical disk 1 so as to record or reproduce data or a test signal for test writing. At the same time, the pickup 3 allows a photodetector to detect a reflected beam from the optical disk 1. In the pickup 3, an objective lens and an actuator for adjusting the position of the objective lens are incorporated so as to adjust focus and tracking. A sled motor 4 allows the pickup 3 to move in the radial direction of the optical disk. A motor driver 5 supplies signals for driving the spindle motor 2, the sled motor 4, and the actuator to them.

A signal processing unit 6 produces a recording signal to be recorded on the optical disk 1 and supplies the same to a laser driver 7. Further, a test writing processing unit 8 produces a test signal whose recording conditions (a laser power and the like) are changed stepwise. On the other hand, the signal processing unit 6 processes the detected signal from the pickup 3 to produce an RF signal, a focus error signal (FE), a tracking error signal (TE), and the like. The RF signal is demodulated into reproduced data by a demodulation unit 9. For the reproduced test signal, the test writing processing unit 8 assesses its quality to derive the optimum recording condition.

Further, in the apparatus, a deviation detecting unit 10 detects deviations on the disk on the basis of "a fluctuation amount" of the FE signal and the TE signal, and registers information of the detected deviations onto a deviation area registration memory 11. On recording and reproducing the test signal, the test writing processing unit 8 refers to the deviation information that is registered on the deviation area registration memory 11, and records and reproduces the test signal while skipping areas where the deviations are present. A microcomputer 12 controls the entire apparatus, and at the same time, controls the detection and registration of the deviations when executing the test writing, and a series of operations in relation to processes of skipping the deviations.

Figure 2:
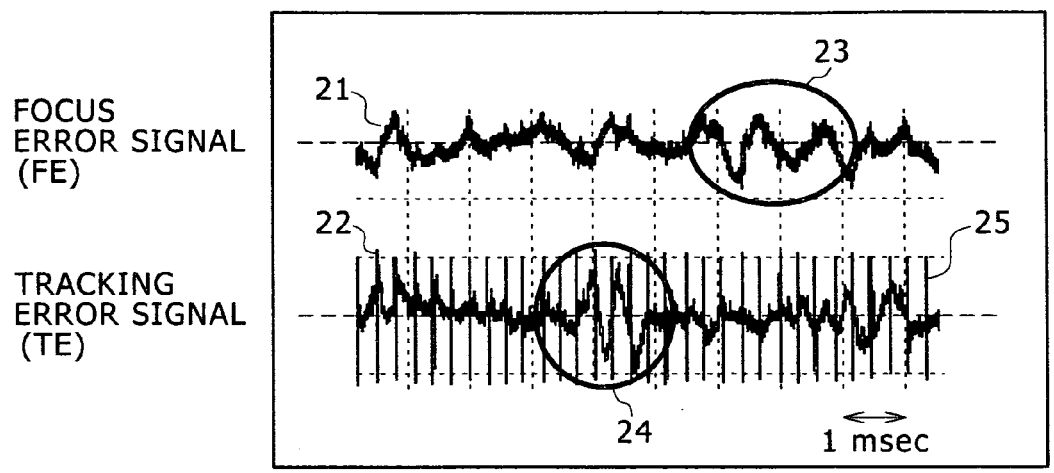
FIG. 2 is a diagram illustrating occurrence and detection of deviations.

FIG. 2 is a diagram illustrating occurrence and detection of deviations. In this case, there are shown respective waveforms of a focus error signal (FE) 21 and a tracking error signal (TE) 22 produced using a reflected beam from outer circumferential areas of a DVD-RAM with no data being recorded that rotates at a high speed (8 times speed). In some cases, an optical disk having a guide groove includes a defective portion (deviation) in a groove shape due to deterioration of a disk stamper, defective formation of the disk, and the like. In the case where such a disk is allowed to rotate at a high speed, specific noise components in a wideband are mixed into a reflection signal from the groove, especially at the outer circumferential areas. In FIG. 2, the portion indicated by numeral 23 included in the FE signal 21 and the portion indicated by numeral 24 included in the TE signal 22 are "deviations" of signals (hereinafter, referred to as deviation signals) that are caused by the deviations on the disk. In this example, the deviation signal mixed into the FE signal has a bandwidth of about 1 MHz. It should be noted that the pulse signal indicated by numeral 25 included in the TE signal 22 is generated by a signal of an address that is assigned to the guide groove of the DVD-RAM in advance, and thus has no relation to the deviations.

The deviation signal causes deterioration of a servo control, but has a frequency higher than a residual error of a servo bandwidth in synchronization with a rotational period of a disk and the like. Therefore, it is difficult to suppress the deviation signal in the bandwidth of the servo loop of the disk. Accordingly, the recording and reproducing operations become unstable at the areas where the deviations are generated, which makes it difficult to assess the recording and reproducing quality at the time of recording condition learning.

The deviation detecting unit 10 detects the deviation signals from the FE signal and the TE signal. Each of the FE signal and the TE signal includes moderate variation components caused by eccentricity of the disk or surface oscillation and instant variation components that are generated at a specific position on the disk. The deviation is generated at a specific location on the optical disk to cause the specific instant variation in each rotation of the disk. Therefore, the instant variation components are separately extracted for detection of the deviation. For instance, the FE signal and the TE signal are sampled at predetermined intervals, and a difference value between adjacent sampled values is recognized as the deviation signal. Further, in the case where the amplitude of the extracted deviation signal exceeds an acceptable value that is determined on the basis of a servo tracking capability of the apparatus, it is determined that some problems exist.

Figure 3:
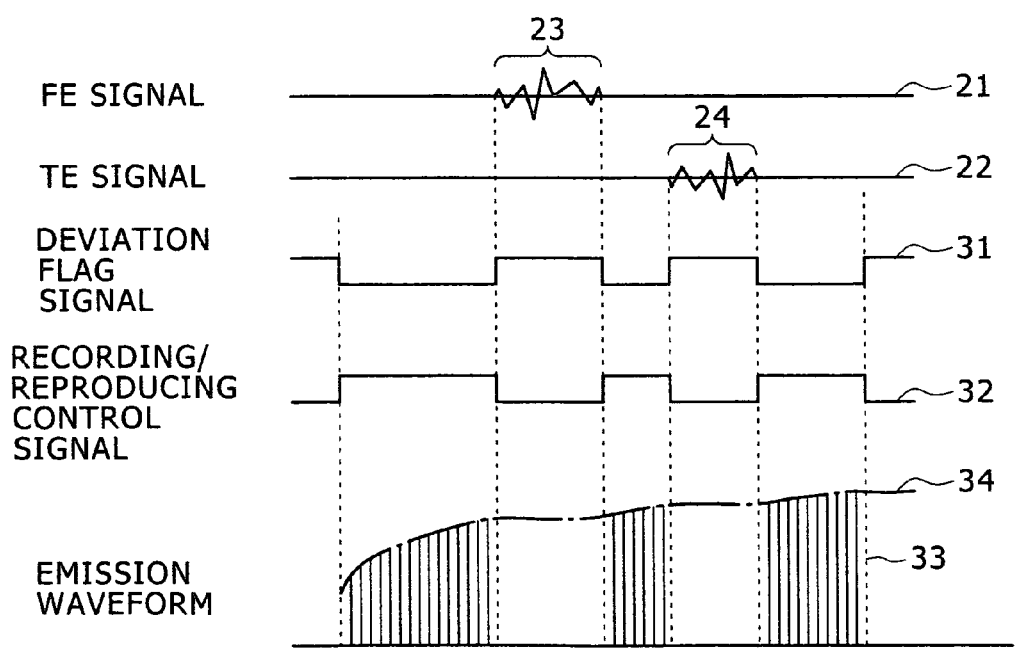
FIG. 3 is a diagram illustrating a method of performing test writing while skipping the deviations.

FIG. 3 is a diagram illustrating a method of performing test writing while skipping the deviations. It is assumed that the deviation detecting unit 10 detects the focus deviation signal 23 from the focus error signal (FE) 21 and the tacking deviation signal 24 from the tracking error signal 22. When the deviation signals 23 and 24 are detected, the deviation information indicating that the deviations are present at the areas is registered on the deviation area registration memory 11. The test writing areas are divided, for example, on a sector unit, and the deviation information is managed on a sector unit. However, the test writing areas may be divided on a block unit or a cluster unit. The test writing processing unit 8 refers to the deviation information registered on the deviation area registration memory 11 to produce a deviation flag signal 31 (High indicates that a deviation is present and Low indicates that no deviation is present). Further, the test writing processing unit 8 produces a recording/reproducing control signal 32 used at the time of test writing according to the deviation flag signal 31. The recording/reproducing control signal 32 suspends the recording when the deviation flag signal 31 indicates High, and executes the recording when the deviation flag signal 31 indicates Low. On receiving the recording/reproducing control signal 32, the laser driver 7 controls ON/OFF of laser emission. As a result, a laser beam represented by an emission waveform 33 is irradiated onto the optical disk 1 from the pickup 3. As being represented by the emission waveform 33, the laser emission is interrupted at the areas where the deviation signals 23 and 24 are detected. It should be noted that numeral 34 shows changes of the power level of the test signal. However, even if the laser emission is interrupted, the power level is changed so that the level continues around the interruption sections. Further, in the case where the test signal is reproduced after recording, the reproducing operations are controlled so as to be interrupted by using the deviation flag signal 31. Thereby, the test writing can be performed while skipping the areas where the deviations are detected.

Figure 4:
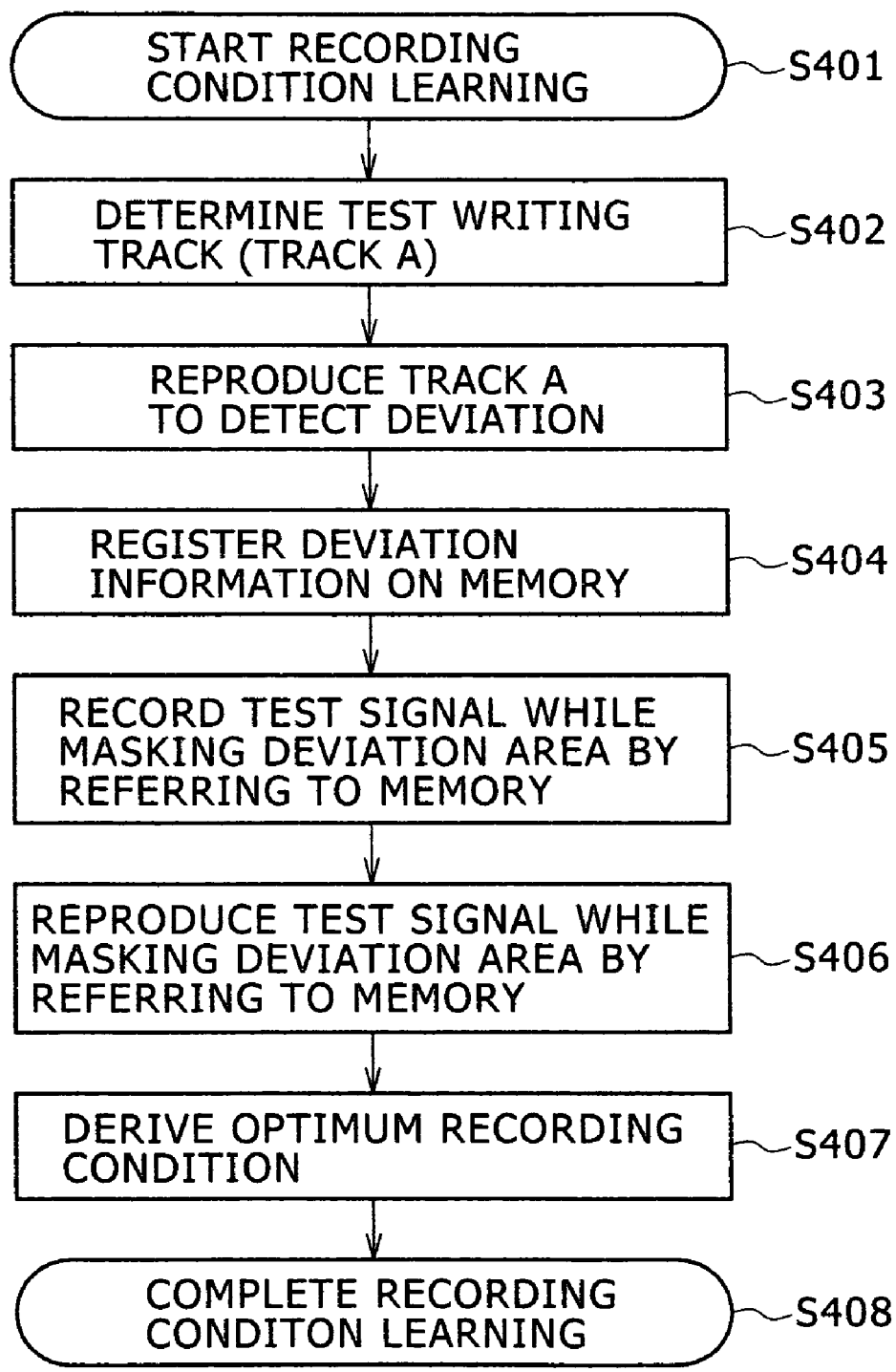
FIG. 4 is a flowchart showing an example of a test writing process.

FIG. 4 is a flowchart showing an example of a test writing (recording condition learning) process in the embodiment.

When receiving an instruction of starting the recording condition learning from the microcomputer 12 (S401), a track (it is assumed as track A) on the disk where the test writing is executed is determined (S402), and it is checked at first whether or not the deviations are present at an area of the track A. The focus error signal (FE) and tracking error signal (TE) are produced by using a reflected beam obtained by reproducing the track A. Then, the deviation detecting unit 10 detects the deviation signals on the basis of the "fluctuation amount" of the FE signal and the TE signal (S403). Thereafter, information about the detected deviations is registered on the deviation area registration memory 11 (S404).

Next, the test writing of the test signal whose recording conditions are changed is executed on the basis of the obtained deviation information. The deviation information is read from the deviation area registration memory 11 to perform the test writing while skipping the areas where the deviations are present (S405). Specifically, as shown in FIG. 3, the deviation flag signal 31 is produced by referring to the information about presence or absence of the deviations, and the test signal is recorded with the emission waveform 33 in which the deviation areas are masked, while the recording/reproducing control signal 32 is controlled by using the deviation flag signal 31.

Even when the recorded test signal is reproduced, as similar to the above, the deviation information is read from the deviation area registration memory 11 to reproduce the test signal while masking the deviation areas (S406). The quality of the reproduced signal is assessed to derive the optimum recording condition from the condition on which target quality can be obtained (S407). The learning of the recording condition is completed (S408), and then subsequent operations of recording data are performed on the optimum recording condition.

According to the above-described process of the recording condition learning, it is possible to prevent a wrong optimum recording condition from being derived due to the presence of the deviations, especially, in deriving a recording condition by using the outer circumferential areas of the disk that rotates at a high speed, thereby improving the accuracy of the recording condition learning.

FIG. 5 is a flowchart showing another example of the test writing (recording condition learning) process in the embodiment. In the example, the checking of the deviations is performed in parallel with the test writing process.

When receiving an instruction of starting the recording condition learning from the microcomputer 12 (S501), a track (it is assumed as track A) on the disk where the test writing is executed is determined (S502), and recording of the test signal onto the track A by test writing is started (S503). In parallel thereto, the deviation signals are detected from the areas where the test signal is recorded on the basis of the "fluctuation amount" of the obtained FE signal and TE signal (S504). If the deviations are detected, the areas are skipped (for instance, the deviations are detected on a sector unit and the sector including the deviations is skipped). Thereafter, information about the detected deviations is registered on the deviation area registration memory 11 (S505). When the test writing of the predetermined test signal is completed, the test signal is recorded while skipping the deviation areas (S506).

When the recorded test signal is reproduced, the deviation information is read from the deviation area registration memory 11 to reproduce the test signal while masking the deviation areas (S507). The quality of the reproduced signal is assessed to derive the optimum recording condition from the condition on which target quality can be obtained (S508). The learning of the recording condition is completed (S509), and then subsequent operations of recording data are performed on the optimum recording condition.

According to this method, since the checking of the deviations can be performed in parallel with the test writing process, it is possible not only to improve the accuracy of the recording condition learning, but also to reduce the time required for the recording condition learning.

It should be noted that a DVD-RAM is used as an optical disk in the above-described embodiment; however, it is needless to say that a target optical disk is not limited thereto. Further, the embodiment is remarkably effective in the case of using the outer circumferential areas as the test writing areas. However, the embodiment can be advantageously, similarly applied to the case of using inner circumferential areas and middle areas of a disk.

In addition, although the deviation information detected at the test writing areas are registered on the deviation area registration memory 11 of the optical disk apparatus, it is also possible to register the same on the disk itself. Since the occurrence point of the deviation is unique to a disk, the detected deviation information (deviation-detected address) is registered at a predetermined area of a disk, e.g., a DIZ (Disc Identification Zone) area of a DVD-RAM where information unique to an optical disk apparatus can be recorded. When the test writing is performed next time or later, the deviation information is read from the disk and the test writing is performed while masking the deviation areas. Thereby, it is possible to omit the processes of detecting the deviations before executing the test writing and during the test writing, thus reducing the number of processes and the time required for executing the test writing. Further, in processes (detection of default areas and registration on the disk by pre-recording) of formatting a disk before shipment, it is possible to register the deviation information with regard to the test writing areas onto the disk. The deviation detecting processes performed by the optical disk apparatus can be further reduced by referring to the deviation information.

What is claimed is:

1. An optical disk apparatus for adjusting a recording condition by test writing when a laser beam is irradiated on an optical disk for recording data, the apparatus comprising:
 a spindle motor which rotates the optical disk;
 a pickup which irradiates the laser beam on test writing areas of the optical disk to record and reproduce a test signal;
 a signal processing unit which obtains a reproduced signal of the test signal, and a focus error signal or a tracking error signal from a signal detected by the pickup;
 a defect detecting unit which detects defects on the optical disk on the basis of a fluctuation amount of the obtained focus error signal or tracking error signal; and
 a test writing processing unit which supplies the test signal to the pickup and assesses the quality of the reproduced signal of the test signal that is obtained by the signal processing unit to adjust the recording condition,
 wherein the test writing processing unit records the test signal to an adjacent area in a testing area while skipping areas where the defects are detected by the defect detecting unit, and reproduces the test signal while skipping the areas where the defects are detected.

2. The optical disk apparatus according to claim 1, further comprising a memory on which information about the defects detected by the defect detecting unit is registered,
 wherein the test writing processing unit interrupts the recording and reproducing of the test signal in the areas where the defects are detected by referring to the information about the defects registered on the memory.

3. The optical disk apparatus according to claim 1, wherein:
 information about the defects detected by the defect detecting unit is registered in a predetermined area on the optical disk, and
 the test writing processing unit interrupts the recording and reproducing of the test signal at the areas where the defects are detected by referring to the information about the defects registered on the optical disk.

4. The optical disk apparatus according to claim 1,
 wherein the defect detecting unit samples the focus error signal or the tracking error signal at predetermined intervals to detect the defects on the basis of a difference value between adjacent sampled values.

5. A test writing method for adjusting a recording condition when a laser beam is irradiated on an optical disk for recording data, the method comprising the steps of:
 obtaining a focus error signal or a tracking error signal from areas on the optical disk where test writing is performed;
 detecting defects on the optical disk on the basis of a fluctuation amount of the obtained focus error signal or tracking error signal;
 recording a test signal to an adjacent area in a testing area while skipping areas where the defects are detected, and reproducing the test signal while skipping the areas where the defects are detected; and
 assessing the quality of the reproduced test signal to adjust the recording condition.

6. The test writing method according to claim 5, further comprising the steps of:
 registering information about the detected defects on a memory; and
 interrupting the recording and reproducing of the test signal in the areas where the defects are detected by referring to the information about the defects registered on the memory.

7. The test writing method according to claim 5, further comprising the steps of:
 registering information about the detected defects in a predetermined area of the optical disk; and
 interrupting the recording and reproducing of the test signal in the areas where the defects are detected by referring to the information about the defects registered on the optical disk.

8. The test writing method according to claim 6, further comprising the steps of:
 performing the detection of the defects and the recording of the test signal in parallel;
 when the defects are detected, registering the information about the detected defects on the memory while interrupting the recording of the test signal in the areas; and
 interrupting the reproducing of the test signal in the areas where the defects are detected by referring to the memory.

* * * * *